United States Patent [19]

Schissler

[11] 4,454,645

[45] Jun. 19, 1984

[54] MULTIPLE STATION DRILLING APPARATUS

[75] Inventor: Brian D. Schissler, Springfield, Ohio

[73] Assignee: The O. S. Kelly Company, Springfield, Ohio

[21] Appl. No.: 345,503

[22] Filed: Feb. 3, 1982

[51] Int. Cl.³ .......................................... B23Q 39/04
[52] U.S. Cl. ..................................... 29/563; 29/564; 408/41; 408/43
[58] Field of Search ................... 29/563, 564; 408/31, 408/42, 43, 44, 46, 39, 41

[56] References Cited

U.S. PATENT DOCUMENTS

| 581,830 | 5/1897 | Pendry | 403/DIG. 3 |
|---|---|---|---|
| 1,027,347 | 5/1912 | Lassiter et al. | 404/94 |
| 1,890,495 | 12/1932 | Carlson | 403/404 |
| 1,970,018 | 8/1934 | Poole |  |
| 2,318,619 | 5/1943 | Noel |  |
| 2,877,670 | 3/1959 | Allen | 408/44 |
| 3,015,832 | 1/1962 | Zagar |  |
| 3,264,906 | 8/1966 | Swords | 403/407 |
| 3,635,570 | 1/1972 | DeGelleke et al. |  |
| 3,720,475 | 3/1973 | Leacock | 404/18 |
| 4,163,313 | 8/1979 | Matsuno et al. | 29/563 |
| 4,179,229 | 12/1979 | Kitagawa | 408/41 |

FOREIGN PATENT DOCUMENTS 2058749  5/1972  Fed. Rep. of Germany ........ 408/42
55-120907  9/1980  Japan ........................................ 408/42

Primary Examiner—William R. Briggs
Assistant Examiner—Glenn L. Webb
Attorney, Agent, or Firm—Biebel, French & Nauman

[57] ABSTRACT

A multiple station drilling apparatus is used for performing a large number of repetitive but variable machining operations, and includes a turntable having a plurality of workpiece holding fixtures distributed in spaced relation around its periphery, a plurality of tool supports mounted around and outward of the periphery to provide a sequence of machining stations, a load/unload station for the mounting of workpieces on the fixtures and their removal therefrom, and a motor for driving the turntable in an indexing fashion to bring workpieces held in the fixtures successively into registry with the machining stations. Each tool support includes at least one X-Y positioner which in turn supports a machining tool such as a reciprocating drill. Each machining tool, its associated X-Y positioner, and the turntable are actuated by a control such that the turntables index the workpieces to successive machining stations, and at each station, the X-Y positioners repeatedly position their respective machining tools independently of each other such that each machining tool performs a series of repetitive machining operations within a separate predetermined area on the workpiece.

7 Claims, 19 Drawing Figures

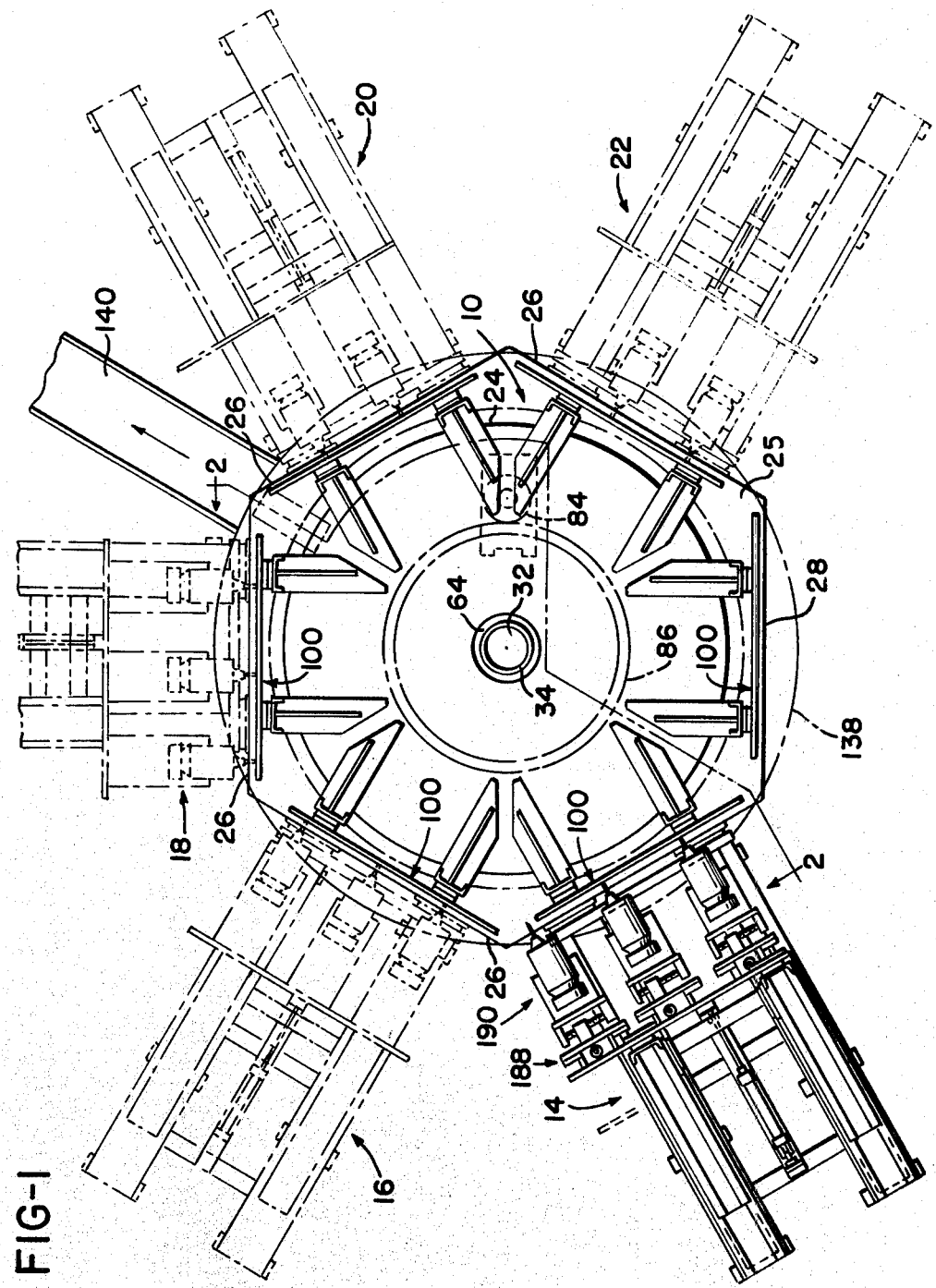

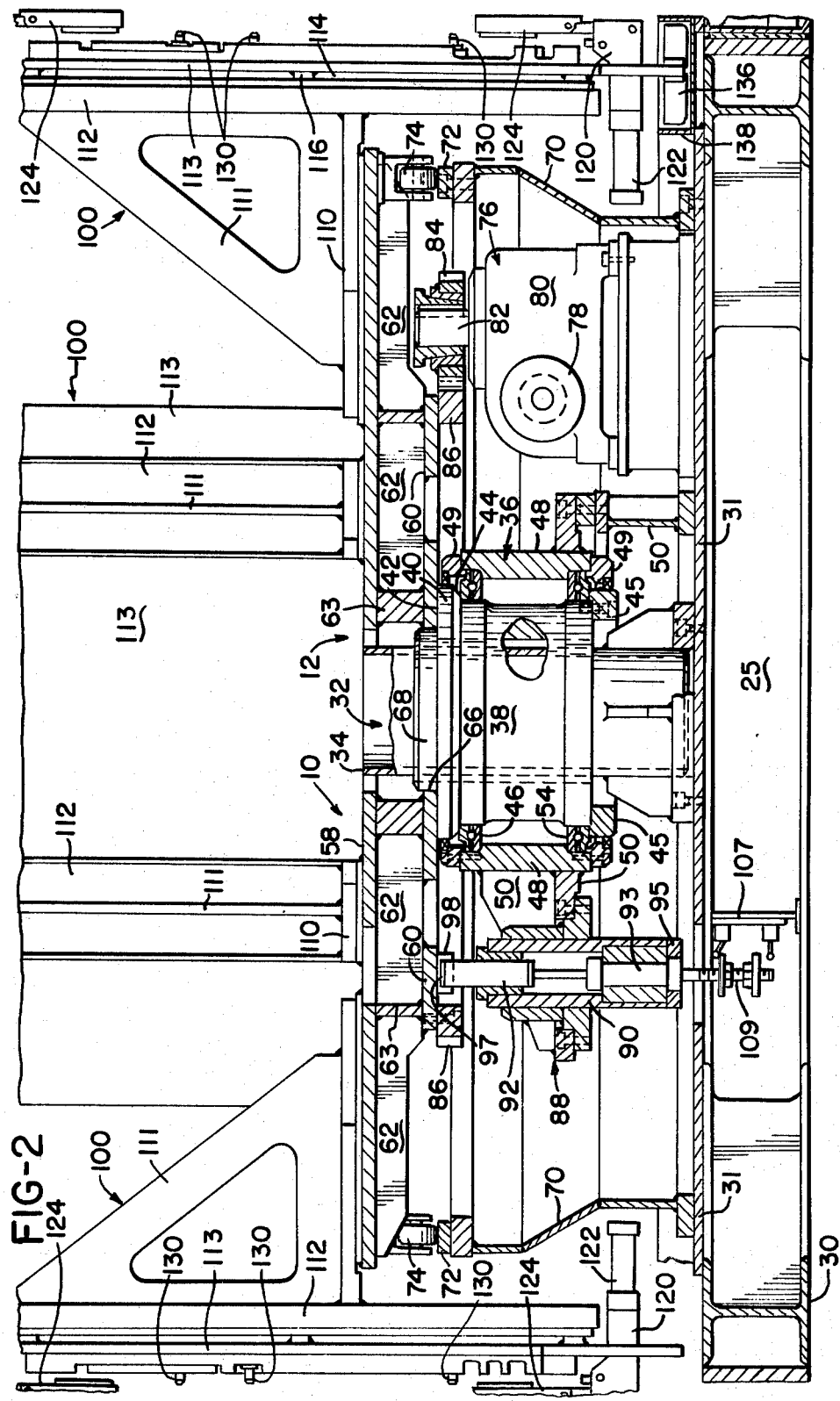

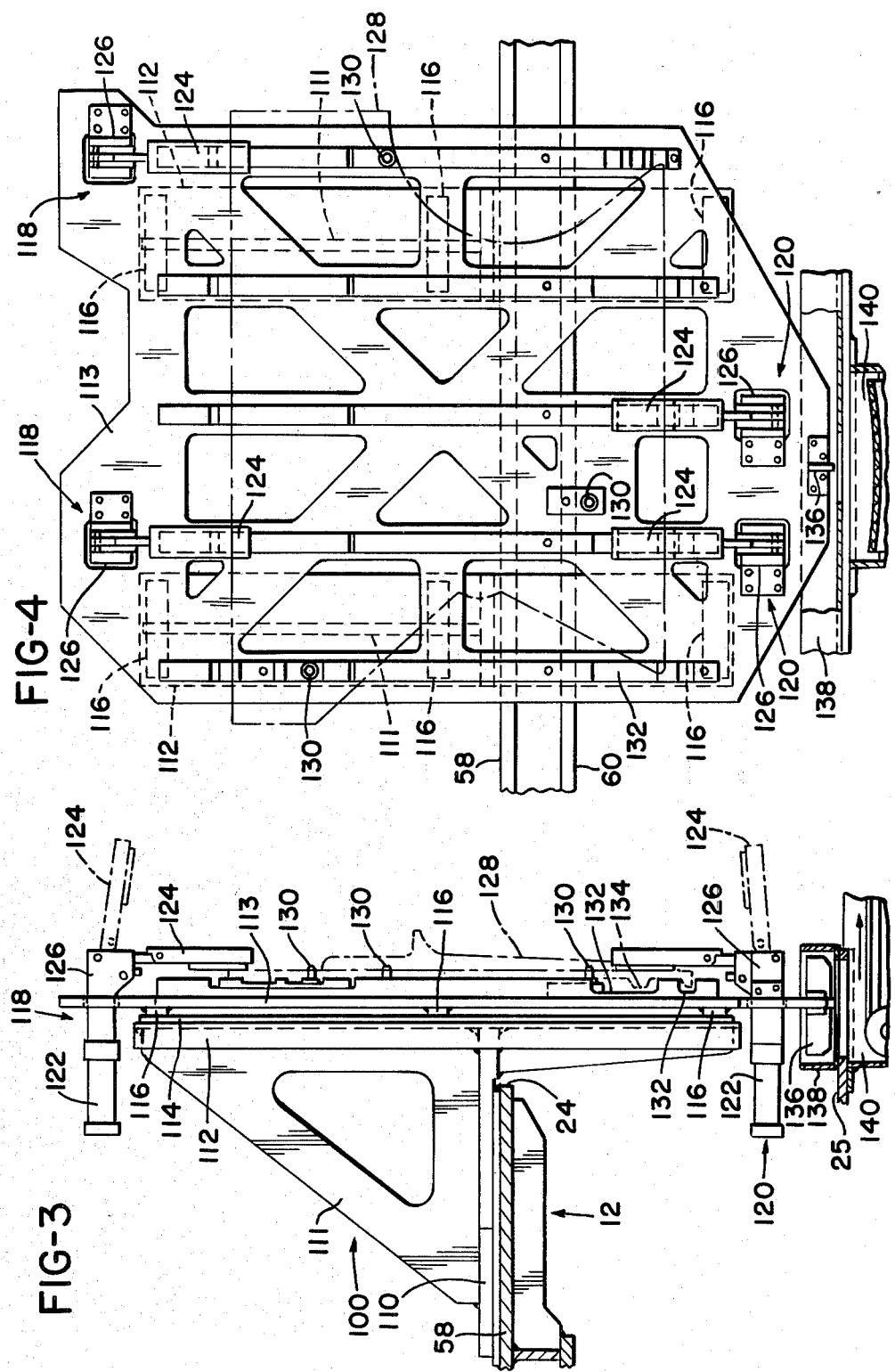

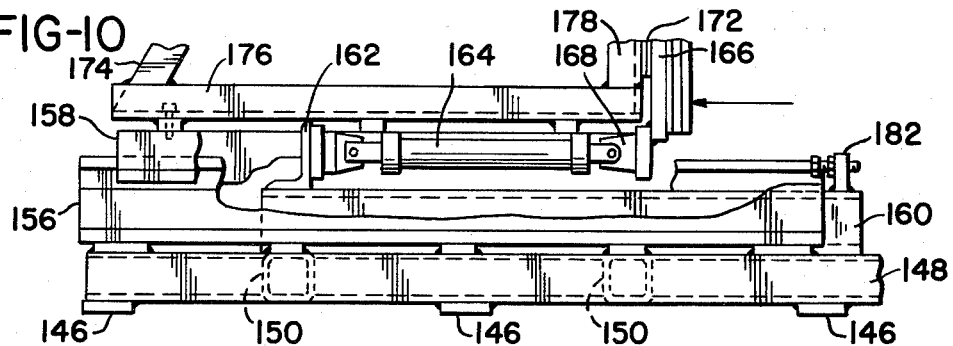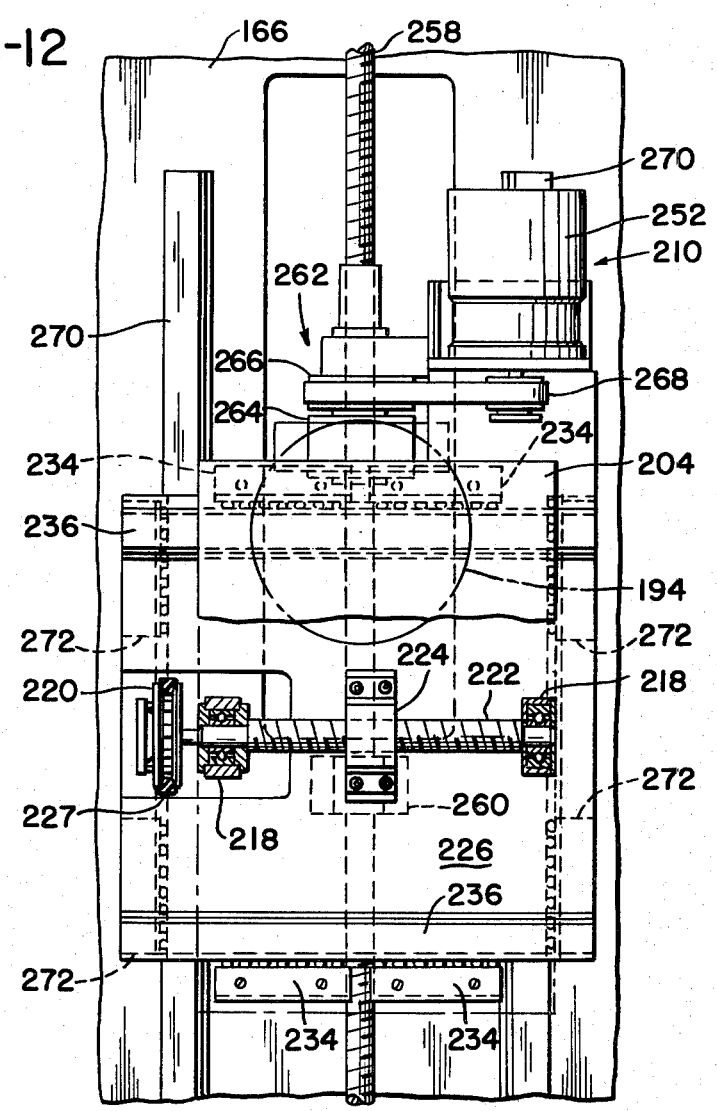

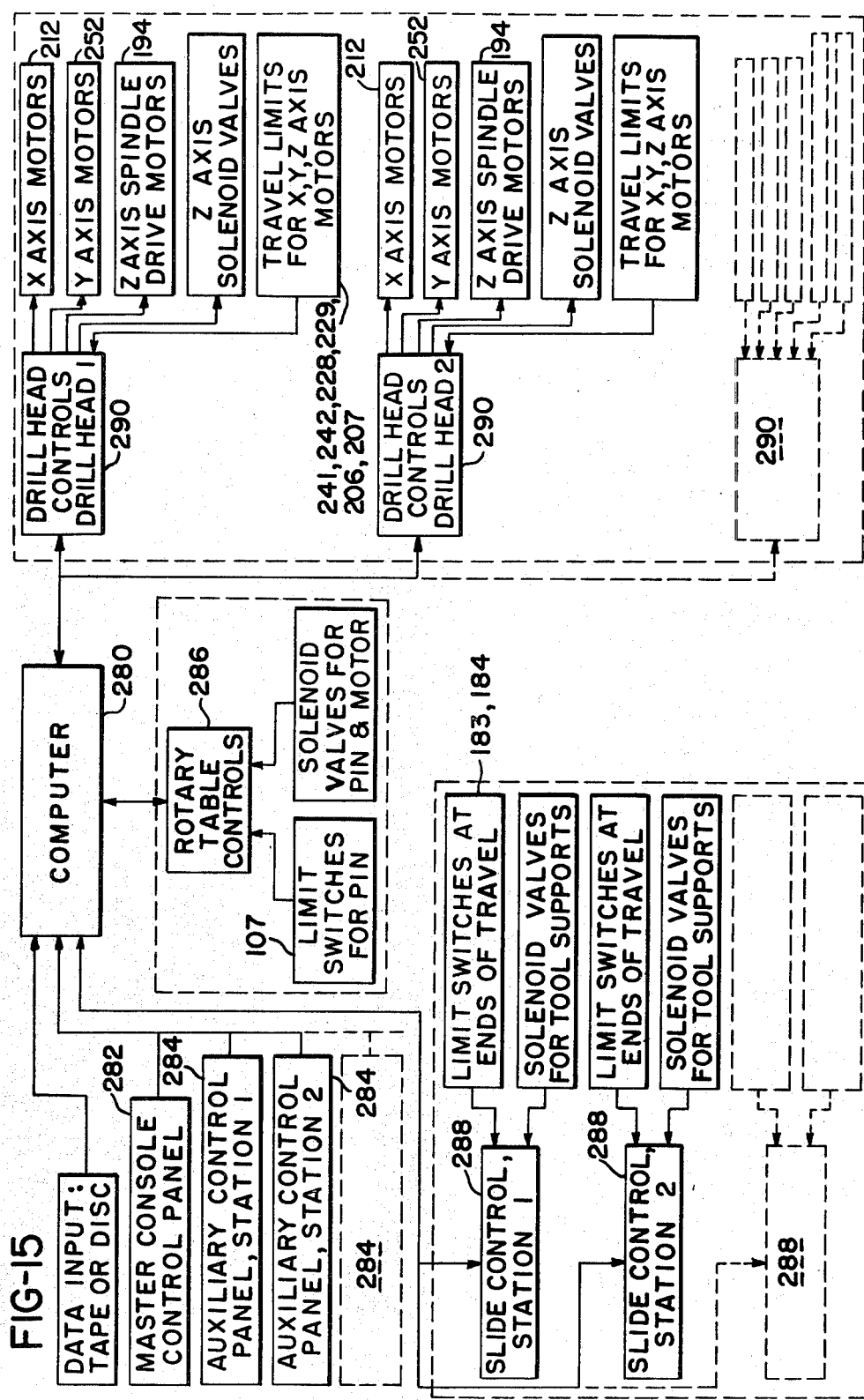

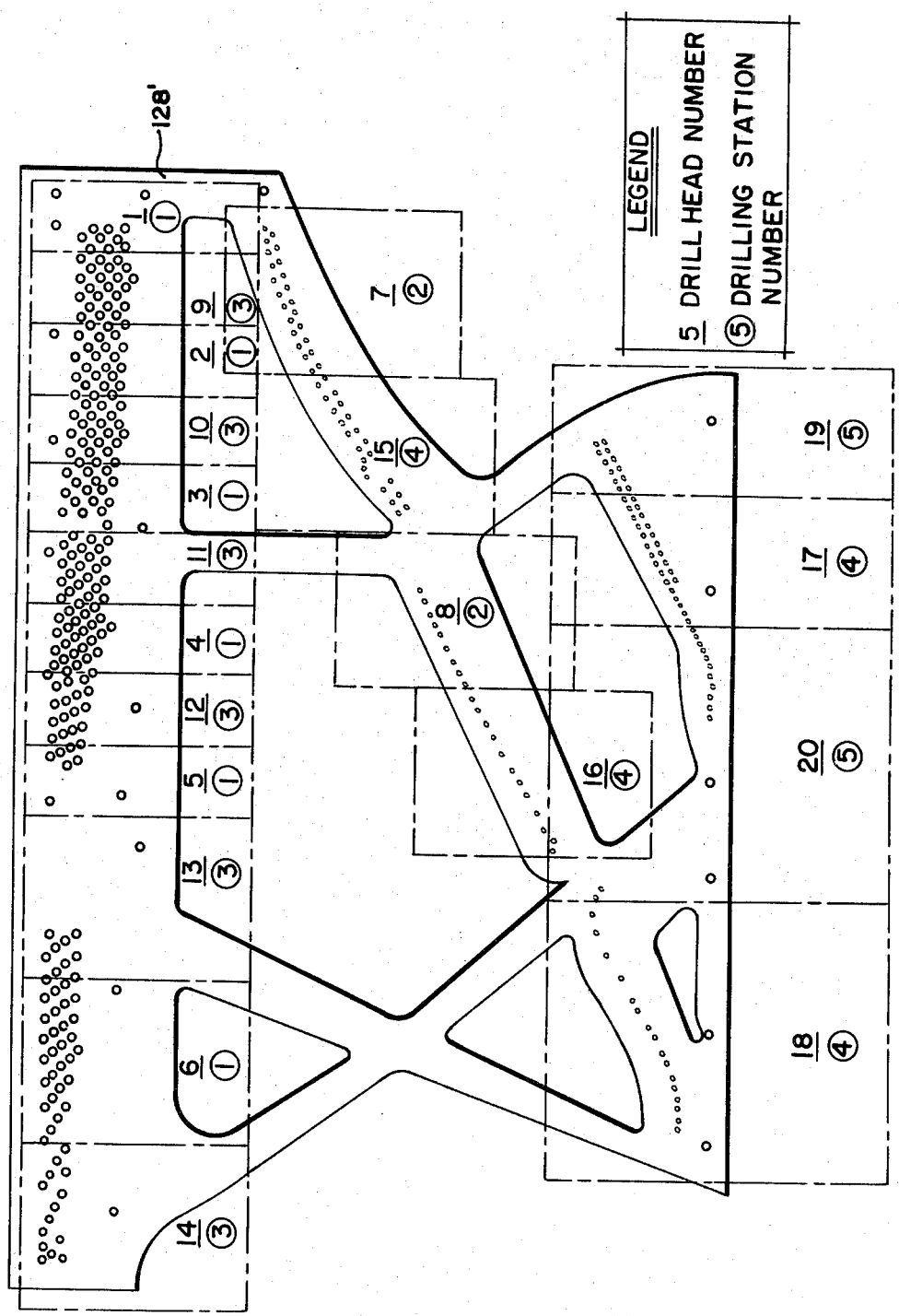

MULTIPLE STATION DRILLING APPARATUS

BACKGROUND OF THE INVENTION

1. Field of the Invention

The present invention relates to automatic machining devices and, in particular, machining devices of the type wherein successive machining operations are performed on a workpiece at different machining stations.

2. Prior Art

For machining workpieces that require a large number of repetitive machining operations, it is desirable to automate as many of the machining operations as possible. By automating all or a large percentage of the machining operations, it is often possible to reduce the labor costs involved in machining the workpiece and at the same time eliminate a monotonous and unchallenging manual task.

One form of apparatus for performing a number of machining operations comprises a rotatable table having a plurality of workpiece holding members and a plurality of machining stations spaced about the periphery of the table. A workpiece is loaded onto a workpiece holding member and the rotatable table is indexed so that the workpiece passes before successive machining stations so the machining tool associated with each machining station may perform a machining operation upon the workpiece. After the workpiece has been indexed through the entire succession of machining stations, it may be unloaded at the original loading station or an unloading station which may be adjacent the loading station.

An example of such an apparatus is disclosed in U.S. Pat. No. 3,720,475. A centrally located indexing table, having a generally circular shape when viewed from above, supports six chucks for holding workpieces. Four machining devices are arranged about the worktable and, together with loading and unloading devices, constitute six work stations. The six work stations are spaced about the indexing table such that the indexing table may be positioned to place each chuck adjacent a work station so the device at each station may perform its operation on a workpiece held in an adjacent chuck simultaneously with the other devices at the other work stations.

Certain of the work stations include vertically oriented drilling machines mounted on reciprocating slides. The slides are reciprocated by the interaction of a cam mounted on the slide and an eccentric cam mounted on a fixed shaft which is rotated by a motor. Another station includes a horizontally disposed drilling device which is supported on slides such that it can be displaced toward or away from the indexing table and a workpiece supported by it.

A disadvantage of the above described apparatus is that each work station is capable of performing only one machining operation upon a workpiece before it. Such a table has severe limitations with respect to the total number of machining operations that can be performed and would be unsuitable for performing a large number of repetitive machining operations upon a workpiece. In addition, there is no disclosure regarding motor structure within the indexing table which would actuate the indexing table and accurately locate the chucks before each work station. Such indexing and locating structure is essential for machining operations requiring high tolerances. Furthermore, the construction of the indexing table and the arrangement of the vertically oriented drill prevent the device from being adapted to perform machining operations on large, plate-like objects which may be too large to be placed upon the indexing table in a horizontal plane.

Another example of a device for performing repetitive operations on a plurality of workpieces is disclosed in U.S. Pat. No. 581,830. This device is designed to manufacture buttons and comprises a rotatable turret which supports a plurality of chucks evenly spaced about the periphery of the turret. A plurality of drills are mounted on fixed platforms about the turret and are spaced so that the chucks may be placed in registry with the drills by rotation of the turret. At each of the drilling stations there is a single drill which is capable of performing a single drilling step at a single location.

The apparatus disclosed in this patent possesses the same shortcomings as the apparatus previously discussed. Since each work station contains a machining tool capable of performing only one machining operation at one location, the entire apparatus is severly limited in the number of machining operations it is capable of performing. While the device does possess a pawl arrangement for locating the turret as it is rotated from station to station, such means is not sufficiently accurate to provide precision location of the workpiece holding members with respect to the work stations to allow close tolerance machining operations. Furthermore, the workpiece holding members cannot accommodate large, plate-like workpieces which require substantial vertical space both above and below the indexing table.

Accordingly, there is a need for an automatic machining device which has the capability of performing multiple machining operations at each work station, thus greatly increasing the total number of machining operations that can be performed by a single device, without a concomitant increase in the size of the indexing table or the number of work stations. In addition, there is a need for an automatic machining machine having an indexing table which is capable of supporting large plate-like workpieces which require substantial space both above and below the surface of the indexing table. Furthermore, there is a need for indexing tables forming part of machining devices which include locating apparatus which permits accurate location of workpiece holding members before each machining station to allow machining operations to be performed having sufficiently close tolerances.

SUMMARY OF THE INVENTION

The present invention provides a multiple station drilling apparatus having a plurality of machining stations spaced about a rotatable turntable, and each of the machining stations is capable of performing a plurality of machining operations on different areas of a workpiece simultaneously. Thus, the drilling apparatus is ideally suited for machining workpieces requiring a high number of repetitive machining operations at a plurality of locations on the workpiece within a short period of time. The present invention also provides a drilling apparatus in which the turntable is capable of supporting large plate-like objects requiring vertical space both above and below the surface of the table in a manner in which the surfaces to be machined are presented to each machining station. The turntable of the present invention also provides a device for accurate location of the turntable so the workpieces may be positioned accurately and securely before each machining station.

Although the present invention may be adapted to machine any number of workpiece shapes or sizes, the apparatus of the invention is ideally suited for machining piano plates. Piano plates typically are made of class 2A or class 3A gray cast iron, which is desirable for its acoustical properties but is extremely hard—typically having a hardness from 20–30 on the Rockwell "C" scale. Piano plates may range in weight from 105 lbs. to 180 lbs. for a modern upright piano, and may be even heavier for a baby grand or grand piano. Piano plates for upright pianos vary in width from approximately 52 inches to 58 inches and vary in height from 35 inches to 47 inches. The piano plates are plate-like objects having thicknesses of from approximately 5/16 inches to ½ inch. However, there are strengthening ribs and thickened portions which define areas on the plate which may be up to 3 inches thick, as well as openings between the ribs and thickened portions.

Approximately four hundred holes must be drilled into an upper surface of the plate to receive the tuning pegs and pins which support the strings of the piano. Of those holes, one-half must be drilled completely through the cast iron, and the remainder are drilled to a depth of approximately 5/16 of an inch. In addition, the holes must be located on the plate with a tolerance of plus or minus 1/32 of an inch.

A preferred embodiment of the present invention is a multiple station drilling apparatus having a turntable with a plurality of workpiece holding fixtures evenly spaced about its periphery, and a plurality of tool supports mounted about the periphery to provide a sequence of machining stations and spaced apart to correspond to the spacing of the fixtures. The turntable includes a reversible, indexing motor which rotates the top portion of the turntable thereby indexing the workpiece holding fixtures with respect to the machining stations, and location means which facilitates the positioning of the fixtures adjacent the tool supports. Each fixture includes hydraulically operated clamps to secure a piano plate workpiece in position.

The tool supports mount X-Y positioners which in turn support machining tools. Each tool support is slidably mounted on a base comprising a pair of hardened slides which permit travel in a radial direction from the center of the turntable. Each tool support is positioned on its associated slides by a double-acting hydraulic cylinder which extends from a cross piece, positioned between the slides, to the tool support itself. Movement of the tool support permits the machining tools to be positioned adjacent the workpieces during the machining operations but allows the tool support to be withdrawn from the periphery of the table to permit indexing of the table after the individual machining steps have been completed.

The machining tools each comprise an electric motor driven drill having a hydraulically actuated reciprocating chuck. The reciprocating chuck allows the drill to be positioned at a predetermined location with respect to a piano plate and the drill actuated to cause a drill bit held by the chuck to penetrate the plate to a predetermined depth, then be withdrawn. The drill motor and hydraulic drill unit preferably are mounted together on a base supported by the X-Y positioner with which it is associated. Thus, the X-Y positioner may be actuated to position the drill unit to a plurality of positions within the area traversed by the positioner, and at each location the drill unit may be actuated to drill a hole in the piano plate workpiece to a predetermined depth.

Although the tool supports may be constructed to support only one X-Y positioner and its associated machining tool, each of the tool supports preferably supports a plurality of X-Y positioners and associated machining tools, each performing a large number of independent and repetitive machining operations simultaneously at each machining station on different areas of a workpiece. By utilizing multiple stations mounting a plurality of drills which act simultaneously to drill holes in different areas of the plates positioned before them on the turntable, a larger number of holes may be drilled in each plate rapidly and economically. In addition, by actuating the X-Y positioners and drill heads so that contiguous areas of a plate are drilled by drill heads of different machining stations, a pattern of holes can be produced having closer spacing than if the pattern were formed such that contiguous areas of the plate were drilled by adjacent drill heads on the same machining station. Thus, any limitations in drill head travel caused by interference with adjacent drill heads are eliminated.

Preferably, a computerized control activates the indexing motor and location means of the turntable, and the X-Y positioners, drilling units, and positioning hydraulic cylinders used with the tool supports. The computer control is capable of coordinating the actions of these components such that a piano plate loaded upon a fixture at a loading station may be clamped to the fixture immediately by the operator, then the tool supports are withdrawn from the table to permit indexing of the turntable, the table is indexed and located, and the tool supports are advanced to the fixtures. The computer control then actuates the X-Y positioners to position the drill units for drilling the first series of holes in the piano plate. The drill units are actuated to advance and retract the drill chucks to form the first holes, and the process is repeated for the holes required within the area traversed by the respective X-Y positioners. After the first series of holes have been drilled, the tool supports are again retracted from the turntable and the turntable is indexed so that a different piano plate is presented to each tool support such that a given fixture is advanced from one machine station to the next until the requisite number of holes is drilled into it.

Accordingly, it is an object of the present invention to provide a multiple station drilling apparatus in which each station accommodates a plurality of machining tools which are programmed to actuate independently to perform machining operations upon different areas of a workpiece; to provide a drilling apparatus which is capable of performing machining operations on large workpieces requiring space above and below the surface of the turntable; and to provide a drilling apparatus in which the turntable is indexed with sufficient accuracy to permit machining operations to be performed on workpieces requiring accurate location of the machining operations, with a minimum of structure.

Other objects and advantages of the invention will be apparent from the following description, the accompanying drawings and the appended claims.

BRIEF DESCRIPTION OF THE DRAWINGS

FIG. 1 is a plan view of multi-station machine constituting a preferred embodiment of the present invention, in which the machine station at the top of the Figure is partially broken away;

FIG. 2 is a cross-section of the machine turntable, taken at line 2—2 of FIG. 1;

FIG. 3 is a side elevation of one fixture of the machine;

FIG. 4 is a front elevation of the fixture shown in FIG. 3;

FIG. 10 is a detail view of a lower portion of a tool support, broken away to show the double-acting cylinder;

FIG. 12 is a detail view of a tool support showing a typical X-Y positioning mechanism, taken on line 12—12 of FIG. 7;

FIG. 13 is a detail cross-section of the Y positioning apparatus taken on line 13—13 of FIG. 7;

FIG. 14 is a fragmentary side view of a drilling unit, showing the belt tensioning apparatus and taken at line 14—14 of FIG. 8;

FIG. 15 is a schematic diagram showing a computer control for actuating the components of the apparatus of the preferred embodiment;

FIG. 17 is an outline view of a piano plate with the areas traversed by the drill heads of the invention marked thereon.

DETAILED DESCRIPTION OF THE PREFERRED EMBODIMENT

General Arrangement

Figure 5:
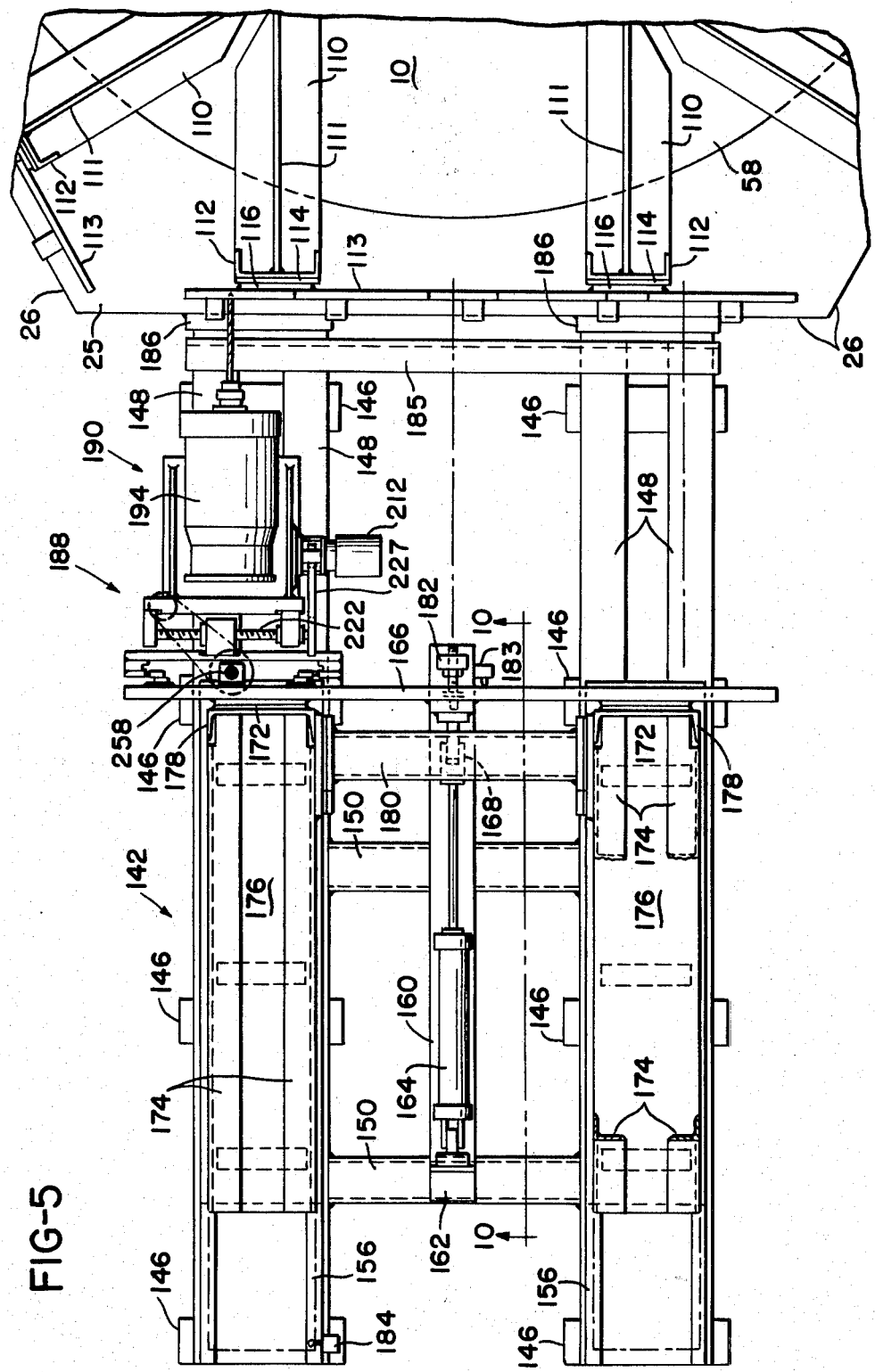
FIG. 5 is a plan view of a tool support and machining tool associated with it.

As shown in FIG. 1, the multiple station machining apparatus includes a turntable assembly 10 having a round turntable 12 surrounded by tool supports 14, 16, 18, 20, and 22, which are evenly spaced about the periphery 24 of the table 12 and define a sequence of machine stations. A hexagonal turntable base 25 supports the turntable assembly 10 and defines flat faces 26 which face tool supports 14, 16, 18, 20, 22. In addition, a face 28 is positioned between the tool support 14 and the tool support 22 to provide a loading and unloading station.

It is understood that the apparatus of the present invention may include any number of machining stations, either more or less than the five shown in FIG. 1, without departing from the scope of the invention. For example, an eight station apparatus may be used having separate loading and unloading stations and six machining stations. Separate loading and unloading stations, rather than the single station at face 28, may be desirable since simultaneous loading and unloading of workpieces may be effected.

Turntable

As shown in FIG. 2, the turntable assembly 10 is mounted on the hexagonal base 25, which is fabricated of I-beam members 30 and support plate 31, and includes a central axle member 32 which supports the table top 12. The central axle member 32 surrounds a hollow shaft 34 which is fixed to the plate 31 and serves as a conduit for hydraulic and electrical cables (not shown). A support spool structure 36 is mounted about the shaft 34. The support spool structure 36 includes a generally annular support spool 38 having an integral upper flange 40 with a relatively flat upper surface 42 and a downwardly and inwardly inclined undersurface 44. The lower end of the spool has a bolted-on flange ring 45. The spool 38 is supported by upper an lower roller bearings 46 which in turn are supported within a collar 48 having bolted-on end rings 49 which contain the bearings in the collar. Collar 48 is welded to a supporting structure 50 which is in turn mounted on the base support plate 31.

The table 12 includes an upper disc 58 and a lower disc 60 joined by spokes 62 and ribs 63. The upper disc 58 and lower disc 60 each define central openings 64, 66 surrounding the central shaft 34. A raised portion 68 extends upwardly through central opening 66. The lower disc 60 rests upon the upper surface 42 of the spool 38, which thus serves to support the table 12 for rotation about axle member 32.

The turntable assembly 10 also includes a fabricated outer annular wall 70 fastened to base support plate 31, and which includes a hardened circular track 72 about its upper periphery. The outer periphery of the table disc 58 includes support rollers 74 which extend downwardly to engage the support track 72 of the outer annular wall 70.

The support plate 52 also holds a drive assembly 76, consisting of a hydraulic drive motor 78 which drives a gear reduction unit 80. Motor 78 is powered by hydraulic lines (not shown) which may extend through the shaft 34 to a conventional source of hydraulic power. The output shaft 82 of the unit 80 is fitted with a pinion 84 which engages a ring gear 86 mounted to the underside of the lower table disc 60. Thus, by actuating the hydraulic drive motor 78, the unit 80 causes the output shaft 82 to be rotated, thereby rotating the table 12 about the central shaft 34. As the table 12 is rotated, the spool is rotated within roller bearings 46, and the rollers 74 move along the support track 72.

The supporting structure 50 also carries a table location means in the form of apparatus 88 which consists of a hollow sleeve 90 containing a sliding pin 92. The pin 92 is positioned upwardly and downwardly by a double-acting hydraulic cylinder 93 which is mounted within the sleeve 90. The pin 92 includes an upper end 97 which is positioned beneath the underside of the lower table disc 60 to engage block-shaped cams 98 mounted to the underside of the lower disc. There are a plurality of cams 98 spaced about the underside of the lower disc 60 in one-to-one correspondence with workpiece holding fixtures 100 supported by the table 12.

Figure 16A:
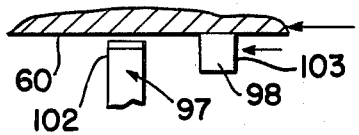
FIG. 16a-c are detail views of the turntable pin encountering a cam as the table top is rotated, taken in sequence.
Figure 16B:
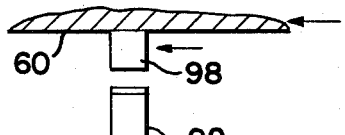
Figure 16C:
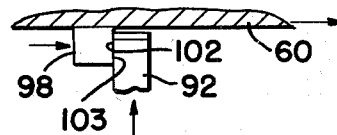

As shown in FIGS. 16a-16c, the pin 92 includes a surface 102 on the end 97, and cams 98 each include a hardened surface 103 which is positioned to engage the surface 102 as the table is rotated in a reverse direction. FIG. 16a shows the pin 92 passing beneath the lower disc 60 as it rotates a cam 98 toward the pin. FIG. 16b shows the pin 92 after having been lowered by cylinder 93 (FIG. 2) so that the cam 98 may pass above it. Once the cam 98 has passed above the pin 92, the hydraulic motor 78 is reversed so that the lower disc 60 is rotated in a reversed sense and cam 98 approaches pin 92. Pin 92 is raised by cylinder 93 (FIG. 2). FIG. 16c shows the cam 98 in engagement with pin 92 so that surface 102 of the pin abuts hardened surface 103 of the cam.

As shown in FIG. 2, this reciprocal motion of the pin 92 by the cylinder 93 actuates limit switches 107 which engage washers 108 on actuating shaft 109 which is fixed to and extends downwardly from the cylinder. When the hydraulic motor 80 reverses, driving the cam 98 back against the pin 92, the table 12 is held in position. Motor 80 preferably includes a pressure relief valve (not shown) which permits it to be maintained in a reverse mode of operation, to hold the table 12 in place, until the motor is reversed in rotation and the table is indexed again indexed.

Plate Holding Fixtures

As shown in FIGS. 1, 2, 3, and 4, the table top 12 supports a plurality of fixtures 100, spaced about the periphery 24 of the top. The six fixtures 100 shown in FIG. 1 are identical in construction. Accordingly, the following discussion will be addressed to the fixtures 100 shown in FIGS. 2, 3, and 4, these being representative of all of the fixtures of the invention.

Each fixture 100 is mounted on a pair of base plates 110 fastened to the upper table disc 58, and includes a pair of vertically disposed gussets 111 that extend above and below the table 12. Each gusset 111 supports a vertical channel 112 to which is mounted the fixture plate 113. As shown in FIGS. 2, 3, and 4, the channel 112 may be separated from the fixture plate 113 by elongated mounting pads 114 and mounting blocks 116 which may be welded in place. The fixture plate 113 supports upper clamping assemblies 118 and lower clamping assemblies 120, each including a double-acting hydraulic cylinder 122 for moving a clamping arm 124 which is rotatably mounted to a clamping housing 126. Clamping housings 126 are mounted to the fixture plate 113.

The clamping arms 124 are shown in the closed or clamped position with solid lines and are shown in the open or release position with phantom lines in FIG. 3. The hydraulic cylinders 122 of the clamping assemblies 118, 120 on each fixture plate 113 are preferably actuated simultaneously by a single hand-operated valve (not shown) located near the plate. An operator positioned at the loading and/or unloading station may then actuate the clamping assemblies 118, 120 of an adjacent fixture plate 113 to mount or remove a plate 128.

As shown in FIGS. 3 and 4, to load a piano plate 128, shown in phantom, it is first positioned on the fixture plate 112 to fit over dowels 130 extending outwardly from the fixture plate, then clamping assemblies 118, 120 are actuated to rotate the clamping arms 124 against the plate to hold it securely against the fixture plate. Fixture plate 113 may also include recesses 132 which are shaped and positioned to receive rib portions 134 of the piano plate 128.

Also shown in FIGS. 3 and 4 is a scraper blade 136 which is mounted to a lowermost portion of each fixture plate 113. Scraper blade 136 is shaped and positioned to fit within a trough 138 which extends about and is supported by the outer portion of the hexagonal base 25 (shown in FIG. 2). Trough 138 empties into a conveyor belt assembly 140 (shown in FIGS. 1, 3, and 4). Trough 138 is positioned below the fixtures 100 to receive metal shavings formed in the machining of the piano plates 128. The scraper blade 136 travels along the trough 138 as the table 12 is indexed, thereby urging the shavings along until they drop onto the conveyor assembly 140 which conveys them to a location remote from the drilling apparatus for collection and disposal.

Tool Supports

Figure 6:
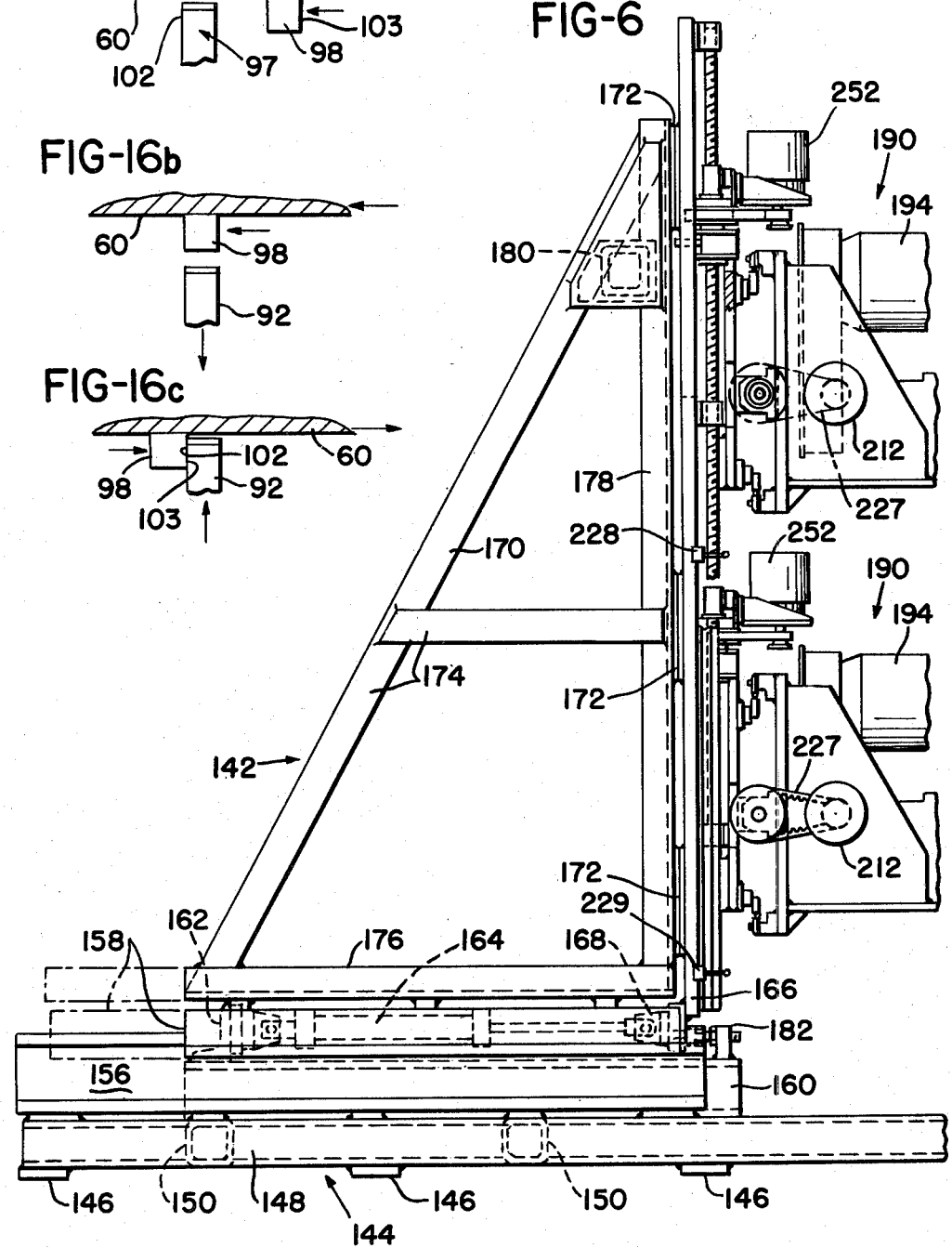
FIG. 6 is a side elevation of the tool support shown in FIG. 5, with the machining tools shown partially broken away.
Figure 9:
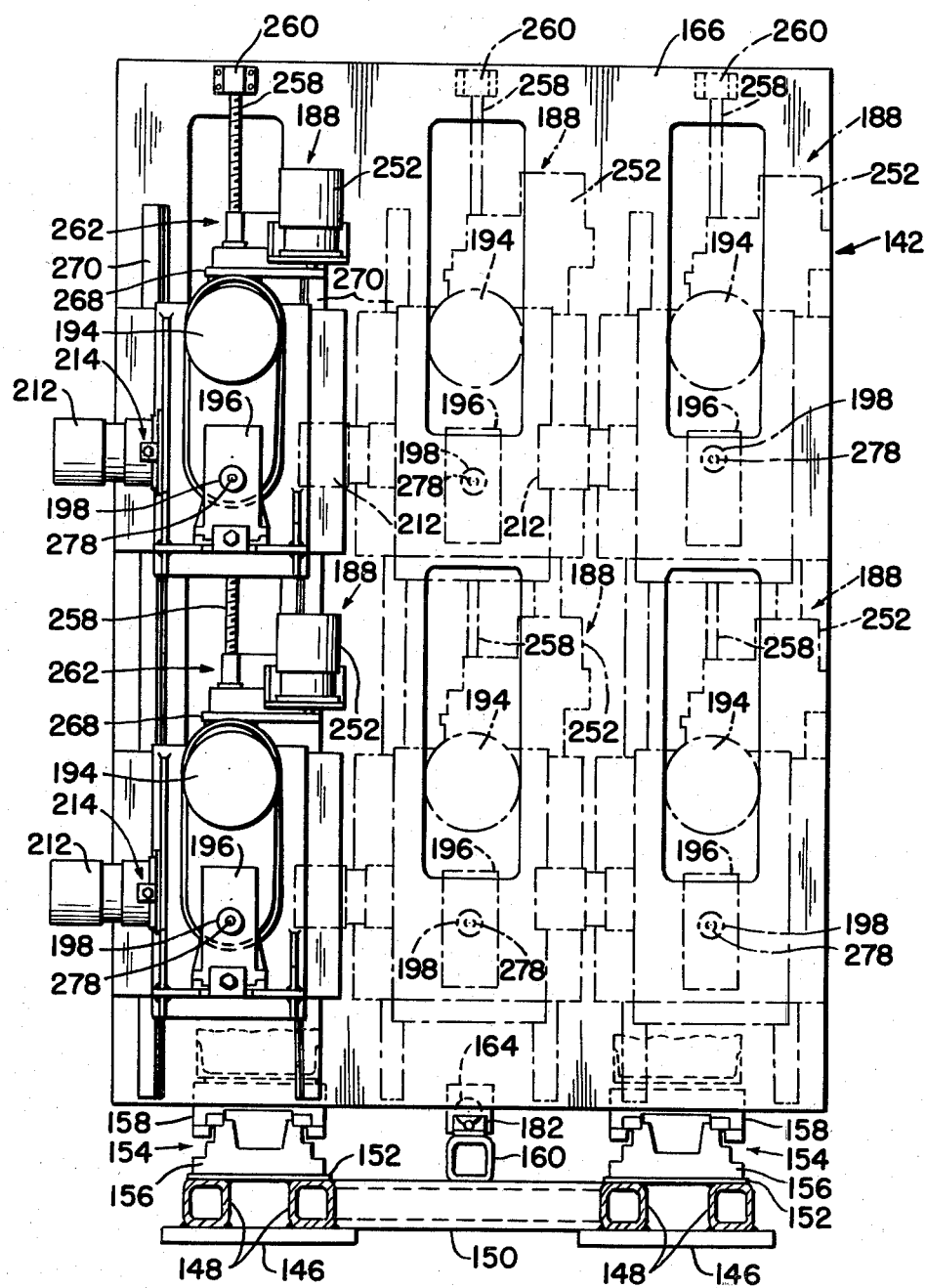
FIG. 9 is a front elevation of a tool support, taken from the right of FIG. 6, and in which four of the six machining tools shown are shown in phantom lines.
Figure 11:
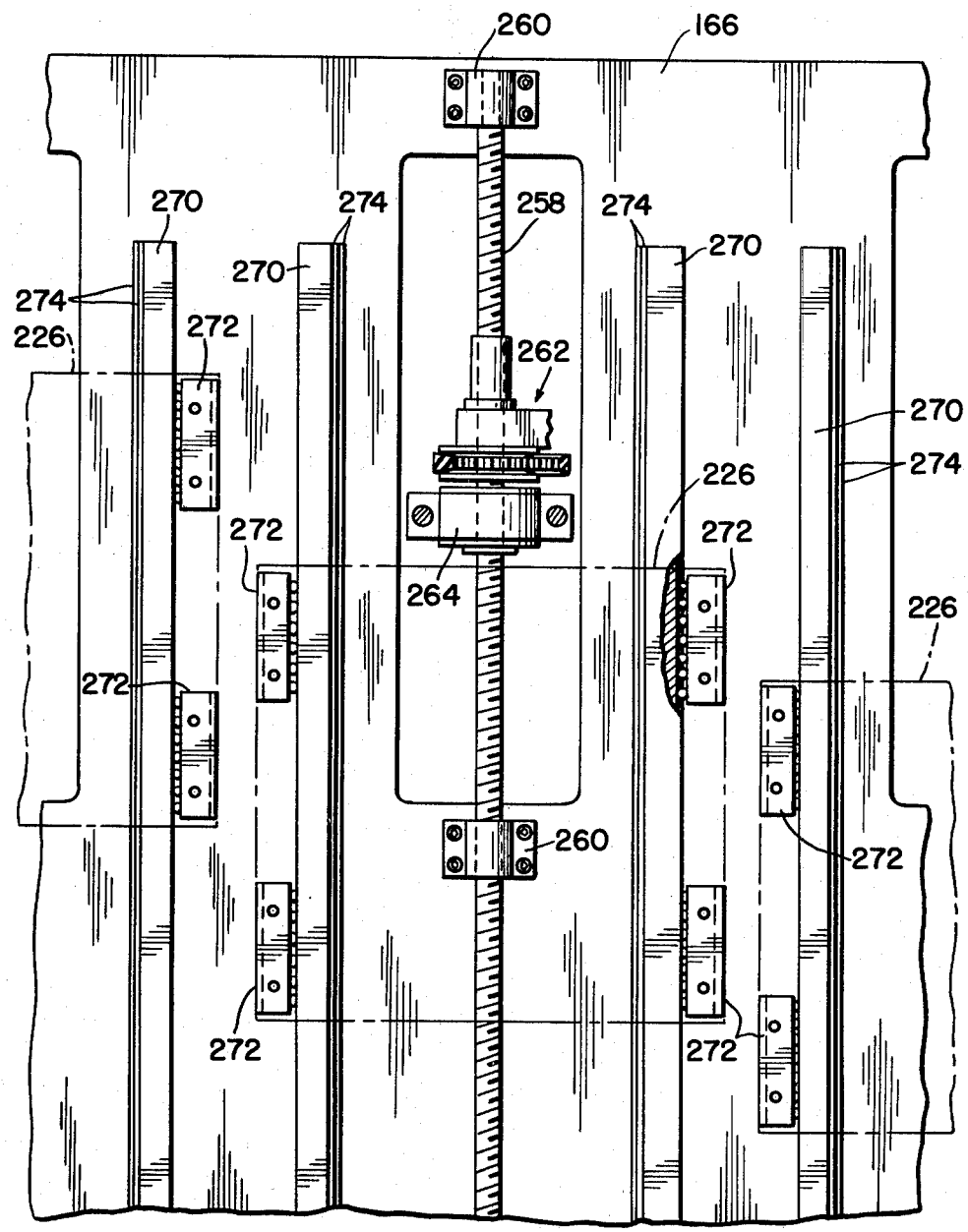
FIG. 11 is a front view of a tool support with the tool removed, taken along line 11—11 on FIG. 8, and with one of the ball slides broken away.

A typical tool support 142 is shown in FIGS. 5, 6, and 9. Tool support 142 is similar in construction to tool supports 14, 16, 18, 20, and 22 shown in FIG. 1 in structure and operation. The differences between the tool supports shown in FIG. 1 lie primarily in the number and location of machining tools associated with each tool support. Tool support 142 is mounted on a base 144 which consists of floor pads 146 which are mounted beneath and welded to longitudinal support tubes 148. Longitudinal support tubes 148 are separated by transverse support tubes 150 and support pads 152 upon which are mounted hardened ways 154. Hardened ways 154 consist of a lower fixed member 156 and an upper slidably member 158.

As shown in FIGS. 5 and 10, a cylinder support tube 160 is welded to transverse tubes 150 and includes a section of angle 162 mounted at its rearward end which rotatably supports a cylinder 164. The opposite end of the cylinder 164 is rotatably attached to a tool support base plate 166 by means of a clevis 168.

Tool support base plate 166 is mounted substantially vertically to a support frame 170 and is separated therefrom by mounting pads 172. Support frame 170 consists of truss members 174 which extend upwardly from a pair of horizontal channels 176 and are welded to a pair of vertical channels 178. Vertical channels 178 are mounted to the mounting pads 172. For additional stiffening, a cross beam 180 extends between the upper portions of the truss members 174.

Thus, as best shown in FIGS. 5 and 6, extension and retraction of the cylinder 164 causes the tool support 142 to be advanced to the turntable assembly 10 as shown in solid lines, or retracted from the turntable to the position shown in phantom. As the cylinder 164 extends, the upper slidably members 158 of the hardened ways 154 slide forward, carrying with them the tool support 142. Conversely, retraction of the cylinder 164 causes the upper slidable members 158 to slide away from the turntable assembly 10, carrying with them the tool support 142. The cylinder support tube 160 preferably includes an adjustable stop 182 which can be adjusted to provide a limit of travel of the tool support base plate 166 toward the turntable assembly 10. Limit switches 183, 184 are mounted to the support tube 160 and lower fixed member 156, respectively, adjacent the extremes of travel of the slidable member 158. Limit switch 183 is activated by contact with the base plate 166, and switch 184 is activated by contact with the rear portion of horizontal channel 176. It is understood that all of the limit switches of the machining apparatus may be varied in location or type to provide appropriate input to a computer control.

As best shown in FIG. 5, the longitudinal support tubes 148 extend outwardly from beneath the tool support 142 toward the turntable assembly 10. The longitudinal support tubes 148 provide a means for spacing the tool support 142 from the turntable assembly and are attached at their ends to a channel 185 which is mounted to the hexagonal base 25 of the turntable assembly 10 by pads 186.

Machining Tools and Positioners

Figure 7:
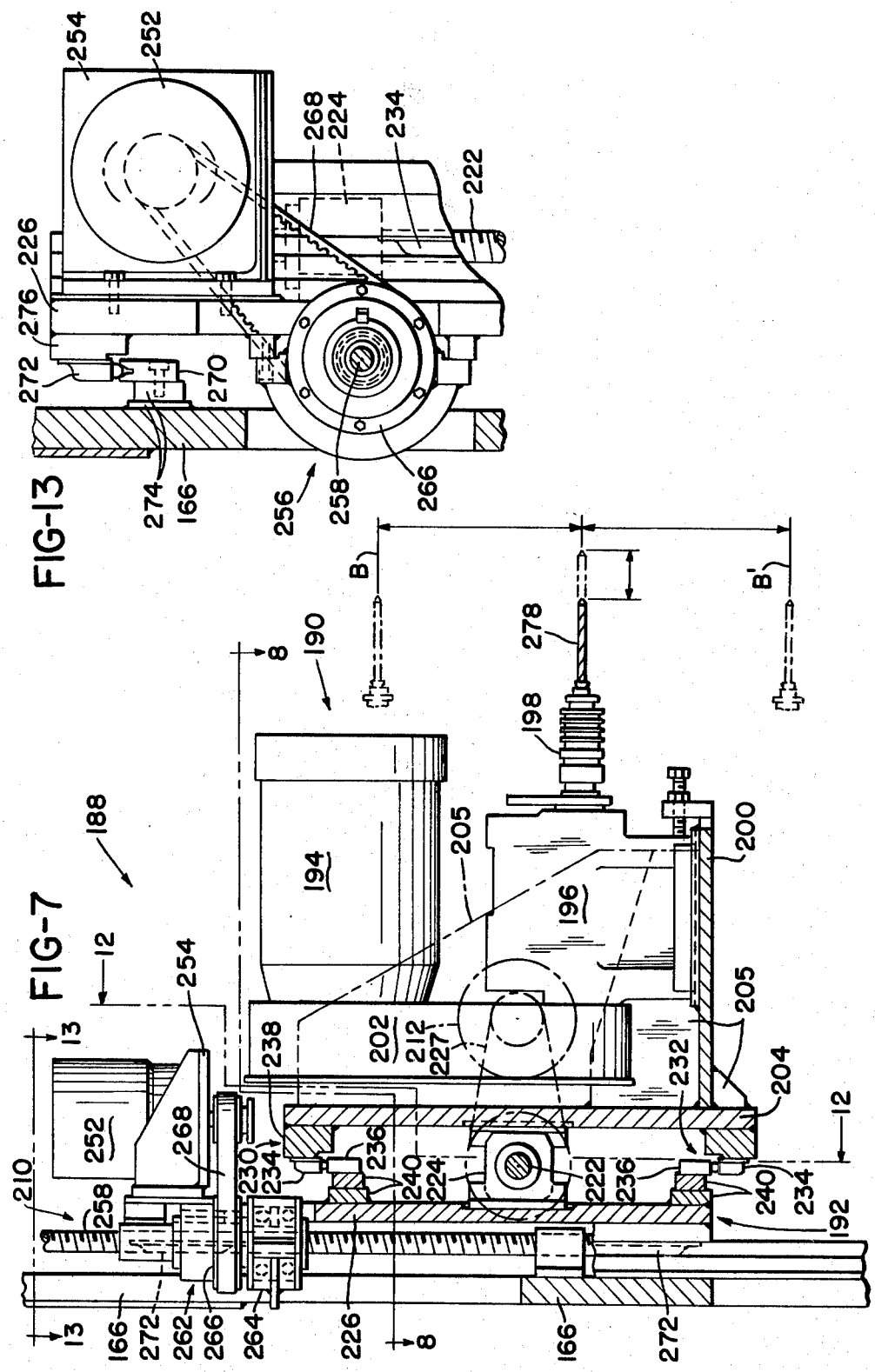
FIG. 7 is a cross-section of a machining tool supported by an X-Y positioner, taken at line 7—7 of FIG. 8.
Figure 8:
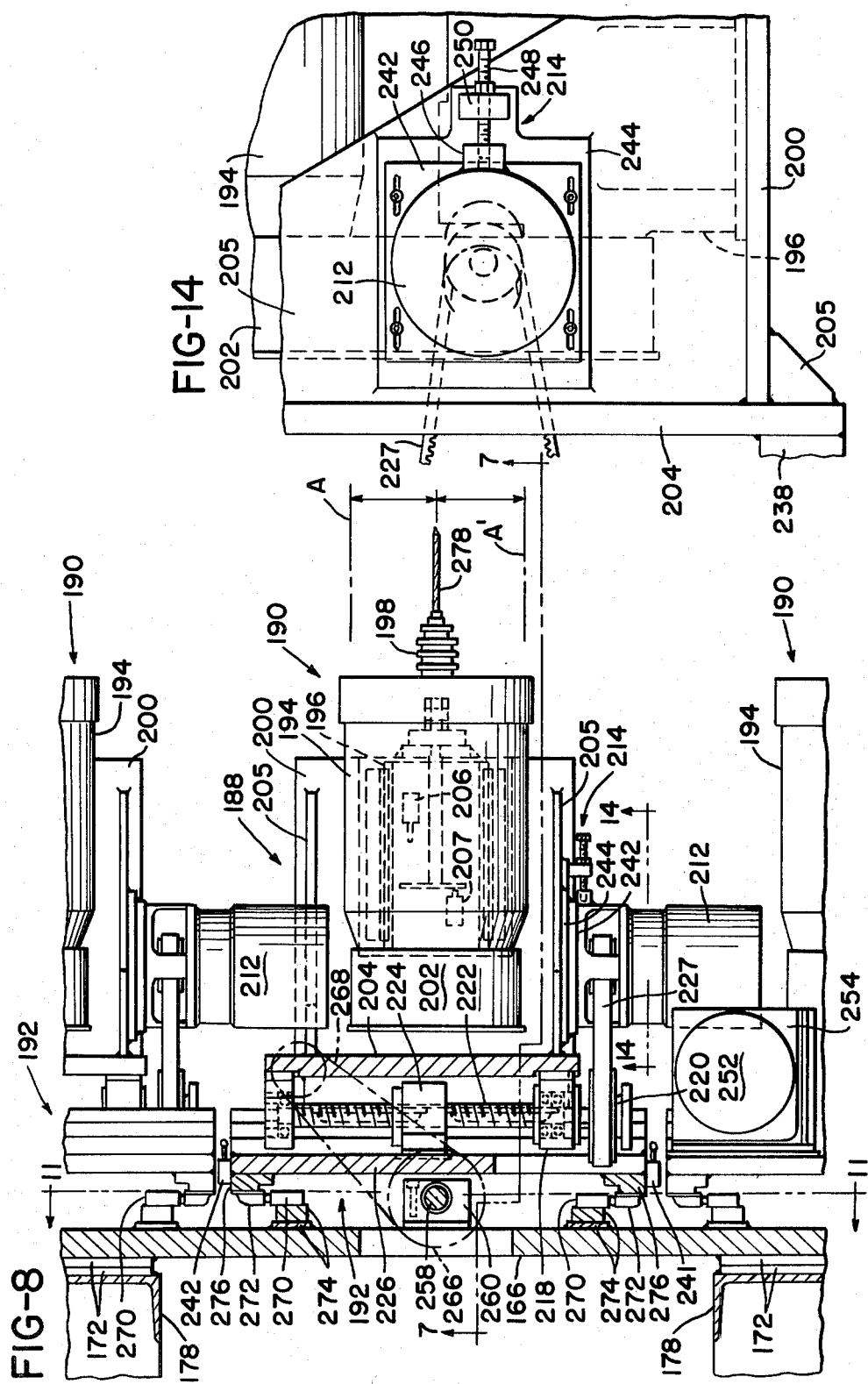
FIG. 8 is a cross-section of the machining tool taken at line 8—8 of FIG. 7.

A typical machining tool 188 is shown in FIGS. 7 and 8. Machining tool 188 includes a drill head assembly 190 which is adjustably supported by an X-Y positioner 192 which in turn is mounted to the tool support base plate 166.

The drill head assembly 190 includes an electric drive motor 194 which is positioned above and drives a drill head 196 having a hydraulically operated chuck 198 which reciprocates in the Z axis direction; that is, toward and away from an adjacent fixture plate 113 (FIG. 5). Drill head 196 is of a type well-known in the art; a suitable head is the series J6, model J6201 power feed unit manufactured by Hause Machines, Inc., Mountpelier, Ohio. Drill head 196 is mounted on a drill base 200 and includes a rigid belt housing 202 which is attached to the motor 194 and provides a mounting bracket for the drill motor. Drill base 200 is welded to a vertical drill wall 204 and includes mounting means such as gussets 205 which extend between the drill base and the drill wall.

Drill head 196 includes internally mounted extend and retract limit switches 206, 207, respectively. Switches 206, 207 regulate the depth of travel of the chuck 198. Similar switches are part of each drill head in the drilling apparatus.

The X-Y positioner 192 comprises an X positioning apparatus 208 and a Y positioning apparatus 210 for moving the drill head 190 in horizontal and vertical direction, respectively, normal to the Z axis direction. The X positioning apparatus 208 is shown in FIGS. 7, 8, and 12. An X drive motor 212 is mounted to a gusset 206 and includes belt tightening means 214. X drive motor 212 drives a ball screw and nut assembly 216 which is rotatably mounted to the drill wall 204 by bearing blocks 218. Ball screw and nut assembly 216 includes an end pulley 220 which is fixedly mounted on a ball screw 222, and a ball nut 224 which is attached to a base plate 226 of the Y positioning apparatus 210. A timing belt 227 extends between the X drive motor 212 and the end pulley 220. Thus, rotation of the end pulley 220 by the X drive motor 212 causes the ball screw 222 to rotate, thereby horizontally displacing the drill head assembly 190 with respect to the fixed ball nut 224 and Y positioning apparatus 210.

As shown in FIG. 6, upper and lower Y-axis limit switches 228, 229, respectively, are mounted to base plate 166 above and below a drill head assembly 190 adjacent the extremes of travel of the moving base plate 226. Switches 228, 229 are activated by contact with base plate 226. Although the switches 228, 229 are shown in FIG. 6 associated with only one drill head assembly 190, it is understood that each drill head assembly will include similarly located limit switches.

As best shown in FIG. 7, the X positioning apparatus 208 also includes upper and lower bearing slide assemblies 230, 232. Upper and lower bearing slide assemblies 230, 232 each include an outer bearing track 234 which engages an inner bearing track 236. Outer bearing track 234 is mounted to drill wall 204 by blocks 238, and inner bearing track 236 is mounted to base plate 226 by mounting blocks 240.

As shown in FIG. 8, left and right limit switches 241, 242, respectively, are mounted to sliding base plate 226 and are positioned at the extremes of motion of the drill wall 204. Switches 241, 242 are activated by contact with the drill wall 204. Similar arrangements exist for all drill head assemblies 190 of the drilling apparatus.

As shown in FIG. 14, the X drive motor 212 is mounted directly to a slidable plate 243 which slides against a fixed plate 244 mounted to the gusset 206. Motor 212 includes an adjusting block 246 which rotatably receives an adjusting screw 248. Adjusting screw 248 threadedly engages block 250 which is fixedly mounted to fixed plate 244. Thus, by positioning screw 248 with respect to fixed block 250, slidable plate 242 is displaced with respect to fixed plate 244, thereby displacing motor 212 with respect to the pulley 220 (shown in FIG. 8). In this manner, the proper tension can be exerted on the belt 228 at all times.

The Y positioning apparatus 210 is shown in FIGS. 7, 8, 11, and 13. Y drive motor 252 is mounted on a motor support plate 254 which is mounted to base plate 226. Y drive motor 252 drives a vertically oriented ball screw and nut assembly 256 which is mounted to tool support base plate 166. Ball screw and nut assembly 256 comprises a fixed ball screw 258, which is mounted to the tool support base plate 166 by mounting blocks 260, and a ball nut 262 which engages the ball screw. A bearing block 264 rotatably engages the ball screw 258 and is mounted to the base plate 226, which also supports the Y drive motor 252. Ball nut 262 includes a drive pulley 266 which is positioned to receive a belt 268 which positively connects the pulley with the Y drive motor 252.

Thus, Y drive motor 252 rotates ball nut 262 which is displaced with respect to ball screw 258. Displacement of ball nut 262 causes base plate 226, which is joined to the ball nut, to be vertically displaced with the ball nut. The bearing block 264, which is attached to the base plate 226, provides an additional point of support between the fixed ball screw 258 and the base plate 226.

As shown in FIGS. 8 and 12, the Y axis positioning apparatus 210 includes an inner bearing track 270 and an outer bearing track 272. The inner bearing track 270 is mounted to the tool support base plate 166 by blocks 274 and the outer bearing track 272 is mounted to the Y positioning apparatus base plate 226 by blocks 276.

FIGS. 7 and 8 show the dimensions of the area which may be traversed by a drill bit 278 mounted within a chuck 198. In FIG. 8, the horizontal distance which may be traversed by a drill bit 278 is shown by lines A, A', which denote the furthest extent of travel of the bit 278 to the left or to the right of the centered position, which is depicted in the Figure. Similarly, FIG. 9 shows the furthest extent of travel in a vertical direction, denoted by lines B, B'. FIG. 7 also shows a preferred minimum amount of travel of the bit 278 along the Z axis.

As shown in FIGS. 6 and 9, a typical tool support 142 may include as many as six machining tools 188, which are shown arranged in two rows of three. To provide a maximum number of machining tools on a given tool support 142, as well as maximum flexibility in mounting the tools 188 on the support 142, it is preferable to utilize a separate Y-axis ball screw 258 for each machining tool 188 on a support. As shown in FIG. 9, the six machining tools 188 utilize six vertical ball screws 258.

It is understood that the tool support 142 of FIG. 9, and the X-Y positioners 208 shown in FIGS. 7 and 8, are representations of a typical tool support and its associated X-Y positioners. In order that the requisite number of holes may be drilled in a plate within the shortest time, each of the drilling stations shown in FIG. 1 carries its complement of drill heads to drill holes in different areas of a piano plate simultaneously. Thus, five plates may be carried by the turntable 12 at one time, each receiving a predetermined number of holes in a different location from each station. After being rotated from the last station 22, the plate would have the requisite number of holes and could be removed from the unloading station at face 28.

The variations in location of the areas traversed by the drill heads 196 can be accomplished by varying the locations of the Y ball screws 258 across the base plates 166, and varying the lengths of the X ball screws 222 to vary the travel of the drill head assemblies 190. These lengths and positions can be varied in literally innumerable ways which would become apparent to the skilled practitioner upon review of this disclosure. One example is shown in FIG. 17, in which a typical piano plate 128' is shown with the areas traversed by each drill head set forth. Station 1 corresponds to tool support 14 of FIG. 1 and mounts six machining tools; station 2 corresponds to support 16 with two tools; station 3 corresponds to support 18 with six tools; station 4 corresponds to support 20 with four tools; and station 5 corresponds to support 22 with two tools. Thus, each area of the plate 128' to receive holes is traversed by one particular drill head of a machining station.

It should be noted that, as a result of the close spacing of holes (not shown) in the typical plate 128', the construction of the X-Y positioners 208 (FIGS. 7 and 8) does not permit contiguous areas of the plate to be drilled by adjacent drill heads 196 on a tool support. In particular, the vertical and horizontal travel of a drill head 196 (FIGS. 7 and 8) is limited by interference of its associated X and Y drive motors 212, 258 with adjacent drill head assemblies. Thus, as shown in FIG. 17, contiguous areas of a plate 128' are drilled by drill heads of different tool supports.

Control System

As shown schematically in FIG. 15, the multiple station drilling apparatus described herein preferably includes an automated control system incorporating a single board computer 280. Such computers are well-known in the art, one example being the SBC 80/10 manufactured by Intel Corporation of Santa Clara, California. Computer 280 is operated from a master console control panel 282, which may be located remotely from the turntable and tool supports. In addition, the computer 280 may be operated from one of the auxiliary control panels 284, each located adjacent a different one of the tool supports. Thus, an operator may be present at a tool support or a load/unload station and operate the drilling apparatus from that location.

The computer 280 actuates the rotary table controls 286, which include the solenoid valves for actuating the hydraulic cylinder 93 (FIG. 2) to positions the locating pin 92, and the hydraulic motor 80 for rotating the table 12. The computer 280 receives signals from the limit switches 107 for the locating pin 92 which indicate when the locating pin has travelled sufficiently upwardly or downwardly to engage or disengage the lug 98 mounted on the turntable 12.

The computer 280 also actuates the various slide controls 288 associated with each one of the tool supports. This includes actuating the solenoid valves (not shown) which permit hydraulic fluid to flow to the cylinders 164 (FIG. 5) to advance or retract the tool support base plates 166 with respect to the turntable 10, to permit the turntable to be indexed and the machining tools to be brought into position with respect to a workpiece mounted on a fixture. The computer control 280 receives signals from limit switches 183, 184 (FIG. 5) positioned at the ends of travel of the ways which indicate when the tool support base plate had been sufficiently advanced or retracted with respect to the turntable.

As shown schematically in FIG. 15, the computer control 280 also actuates and coordinates the drill head controls 290 of each drilling station. Thus, the computer 280 actuates the various X-axis motors 212 (FIG. 8) of each drill head 190 at each machining station, as well as the associated Y-axis motors 252 (FIG. 7), so each drill head can be independently positioned in a predetermined sequence to permit drilling of a predetermined pattern of holes in the workpiece. Similarly, the computer 280 activates the drive motor 194 for the drill spindles of the various drill heads 196, so the drill heads each drill holes at the appropriate time and at an appropriate location. The computer 280 receives signals from limit switches 241, 242 228, 229, 206, 207 (FIGS. 6 and 8) positioned on the base plates 226, 204 and in the drill heads to indicate the respective limits of travel in X, Y, and Z directions of the drill heads. In response to signals received from the Z-axis limit switches 206, 207, the computer control 280 sends signals to solenoid valves contained within the drill heads 196 to position the solenoids to cause the chucks to advance or retract.

The control system includes a data input 292 in which coded information, for example, in the form of tape or on discs, is fed to the computer 280. Thus, the computer can be programmed to activate the drilling apparatus to drill types and patterns of holes for a variety of piano plates.

Sequence of Operations

The operation of the multiple station drilling apparatus of the present invention is as follows. A clean cast piano plate is placed on a fixture at the load/unload station by means such as an overhead traveling crane, then an operator activates the hydraulic cylinders of the clamping assemblies so that the clamping arms of that fixture are rotated to a shut position, thereby firmly clamping the clean cast piano plate to the fixture plate. The table top is then indexed so that the clean cast plate is rotated to the first machining station. At this time a second clean cast piano plate is mounted to the fixture now located at the load/unload station. Simultaneously, the cylinder of the first machining station advances the tool support associated with that station toward the clean cast piano plate. The X and Y positioners of each machining tool associated with the tool support at the first station are actuated to position their respective drills and drill bits to begin drilling holes in the piano plate. The computer actuates each of the drills independently to drill a predetermined pattern of holes in the area traversed by its X-Y positioner.

After the piano plate has been partially machined by the drill heads at the first machining station, the tool support is retracted from the partially machined plate and the top portion of the turntable is indexed so that a clean cast plate is again presented to the first machining station. The partially machined piano plate is simultaneously advanced to the second machining station. The tool supports associated with the first and second drilling stations are advanced toward their respective plates and their X-Y positioners are actuated so that the drill heads may begin drilling their respective patterns of holes. At this time, a third clean cast plate is loaded onto the fixture at the load/unload station.

This process is repeated as the piano plates are advanced from station to station until the first mounted piano plate is again indexed to the load/unload station. At this time, the piano plate has been fully machined and may be removed from the fixture to which it was attached and a clean cast piano plate may be inserted in its place. Accordingly, the drilling apparatus of the present invention provides a system for continuous machining of piano plates.

While the form of apparatus and method herein described constitute preferred embodiments of this invention, it is to be understood that the invention is not limited to this precise form of apparatus or method, and that changes may be made therein without departing from the scope of the invention.

What is claimed is:

1. A machine for performing a large number of repetitive but variable machining operations on plate-like workpieces, comprising:
   a turntable having a periphery and a plurality of workpiece holding fixtures distributed in spaced relation around said periphery;
   a plurality of tool supports mounted around and outward of said periphery in relation correlated to the spacing of said fixtures and providing a sequence of machine stations;
   at least one station for loading and unloading also located around and outward of the periphery of said turntable and at which a machined workpiece is removed from one of said fixtures positioned at said loading and unloading station, and a clean cast workpiece loaded to said one fixture positioned at said loading and unloading station;
   at least one machining tool associated with each of said tool supports;
   drive means connected to rotate said turntable in indexed fashion bringing a workpiece in said fixtures successively to stations aligned with said tool supports;
   at least one X-Y positioner mounted on each of said supports, each of said positioners carrying an associated one of said machining tools and being drivable to preselected locations on a workpiece being held in an adjacent one of said fixtures;
   means for reciprocating said machining tools with respect to a workpiece;
   means for actuating said positioners while said machining tools are withdrawn from a workpiece;
   means supporting each of said tool supports for radial movement relative to said turntable such that said machining tools may be retracted away from said turntable to provide clearance for a fixture supported thereon to be rotated past said machining tools, or advanced toward said turntable to bring said machining tools into close proximity to an associated workpiece to enable said tools to operate thereon; and
   a control coordinating the motions of said turntable, said reciprocating means, said X-Y positioners and said supporting means.

2. The machine of claim 1 wherein said turntable includes:
   a top portion supporting said fixtures;
   central axle means for rotatably supporting said top portion;
   said drive means including means for rotating said top portion to index said fixtures with respect to said machining tools; and
   means for locating said top portion after indexing by said drive means.

3. The machine of claim 2 wherein said locating means comprises:
   pin means mounted to said turntable below said top portion and being capable of reciprocal movement in a vertical plane;
   means mounted to said top portion for receiving said pin means and positioned such that engagement with said pin means can occur only when said fixtures are in registry with said tool supports; and
   means for reciprocating said pin means, said reciprocating means being actuated by said control.

4. The machine of claim 3 wherein said pin means includes a first mating surface at an upper end and said pin receiving means defines at least one second mating surface such that engagement of said first and second mating surfaces provides location of said fixtures with respect to said machining tools.

5. The machine of claims 1 or 4 wherein said machining tools each include a drill head having a drill chuck and said reciprocating means comprises:
   means for feeding and withdrawing said drill chuck such that a drill bit carried by said chuck may be fed into and withdrawn from a workpiece carried on an adjacent one of said fixtures; and
   means for advancing and retracting said tool supports to facilitate indexing of said turntable.

6. The machine of claim 5 wherein at least some of said supports carry a plurality of said positioners, and said control is programmed to activate each of said positioners independently of others of said positioners such that each of said machining tools may drill a predetermined number of holes within a distinct predetermined area on an adjacent workpiece.

7. The machine of claim 1 wherein said supporting means includes pairs of slidable members, each of said pairs associated with and supporting one of said tool supports; pairs of fixed members, each of said fixed member pairs supporting one of said pairs of slidable members; and motor means mounted on said pairs of fixed members for effecting movement of said pairs of slidable members relative thereto.

* * * * *